United States Patent [19]

Bader

[11] Patent Number: 4,893,343

[45] Date of Patent: Jan. 9, 1990

[54] DUAL DIVERGING MANIFOLD LOUDSPEAKER SYSTEM

[75] Inventor: Joseph F. Bader, Crete, Ill.

[73] Assignee: Federal Signal Corporation, Oak Brook, Ill.

[21] Appl. No.: 296,839

[22] Filed: Jan. 13, 1989

[51] Int. Cl.⁴ .......................... H04R 1/30; H04R 1/34; G01K 9/00; G01K 9/12

[52] U.S. Cl. ...................................... 381/156; 381/159; 381/160; 381/153; 381/155; 381/188; 381/205; 181/187; 181/188; 181/194; 181/152; 181/159

[58] Field of Search ............... 381/158, 153, 156, 155, 381/159, 160, 188, 205; 181/187, 188, 194, 152, 159

[56] References Cited

U.S. PATENT DOCUMENTS

| | | | |
|---|---|---|---|
| 2,858,377 | 10/1958 | Levy | 381/153 |
| 4,040,503 | 9/1977 | Hino et al. | 181/159 |

*Primary Examiner*—Jin F. Ng

*Assistant Examiner*—M. Nelson McGeary, III

*Attorney, Agent, or Firm*—Davis Chin

[57] ABSTRACT

A dual diverging manifold loudspeaker system includes a generally cubically-shaped outer horn housing and an inner dome-like cap member for encapsulating therebetween a compression driver assembly. The loudspeaker system includes a back plate member which is secured adjacent to the rear end of the housing. The back plate member includes a first diverter member for diverting a planar sound wavefront into two diverging sound wavefronts, a pair of second diverter members for splitting the two diverging sound wavefronts into four separate planar wavefronts, and reflector members for deflecting forwardly the four separate planar wavefronts toward an open mouth of the housing. A manifold formed by the inner surfaces of the housing and the inner cap member is used to recombine the four separate planar wavefronts back into a single composite wavefront emanating from the open mouth of the housing.

20 Claims, 2 Drawing Sheets

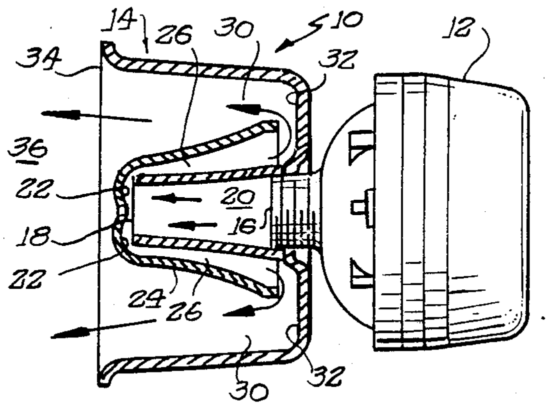
FIG. 1
PRIOR ART
FIG. 2
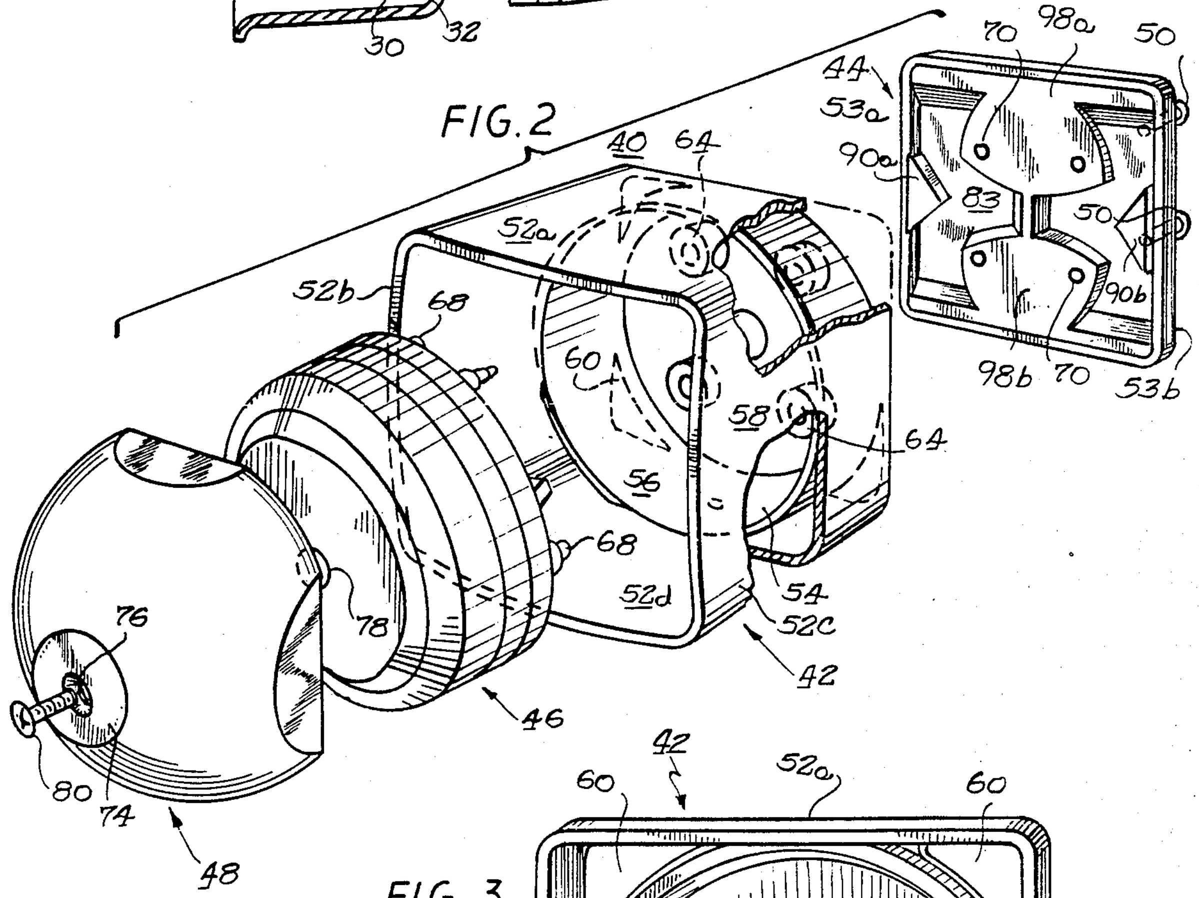
FIG. 3
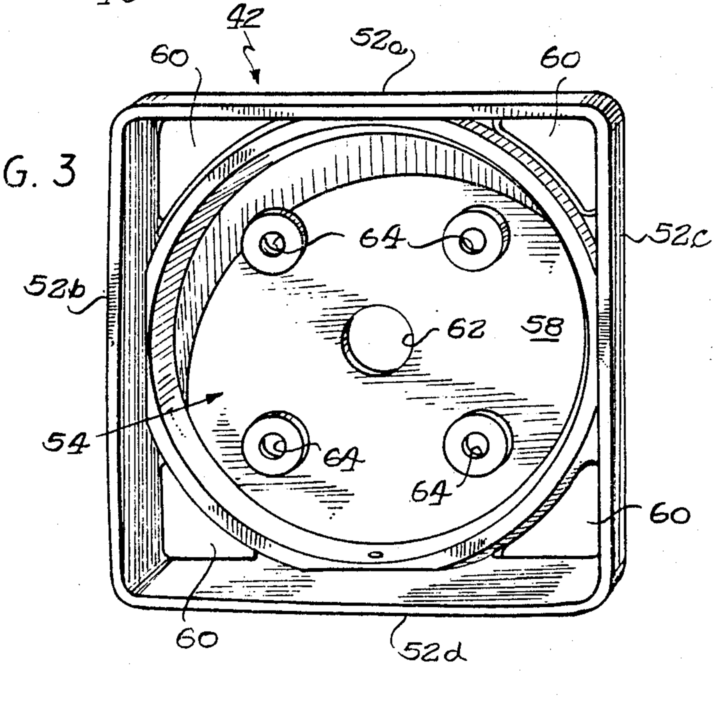

DUAL DIVERGING MANIFOLD LOUDSPEAKER SYSTEM

BACKGROUND OF THE INVENTION

This invention relates generally to re-entrant type horn loudspeakers and more particularly, it relates to a dual diverging manifold loudspeaker system having a unique configuration which produces acoustic pressure levels at least equivalent to that of conventional horn loudspeakers while being smaller and more compact than those traditionally available.

As is generally known to those in the art of high power emergency-warning loudspeaker systems, there is employed typically a compression driver assembly of high power and efficiency which is coupled to a special re-entrant type of horn. Due to space limitations in the emergency-warning loudspeaker industry, the re-entrant type of horn is commonly utilized in which the horn sections "fold" back on itself rather than the use of "straight" horn elements as in the non-emergency loudspeaker field. However, such re-entrant type of horn loudspeakers suffer from the disadvantage of inadequate thermal or heat transfer when combined with an additional housing. As a result, there was a severe limitation on the amount of area where other components and housings could be located near the loudspeaker.

Further, in conventional loudspeaker designs the compression driver assembly is usually mounted behind the re-entrant type of horn so as to face the throat of the horn. Thus, these existing loudspeaker designs were very inefficient in their utilization of space when placed in other housings since the driver assembly would be protruding from the rear of the horn. Also, the prior art loudspeaker designs offer little or no protection from the outside environment for the compression driver assembly without the use of additional housings, thereby increasing materials cost and labor.

A diagrammatic view of a conventional loudspeaker system of the double re-entrant type is illustrated in FIG. 1 and has been labeled "Prior Art." The loudspeaker system is designated generally by reference numeral 10 and is comprised of a compression driver assembly 12 which is mounted behind a horn 14 adjacent a throat 16. A planar sound wave generated by a vibrating diaphragm (not shown) located inside the driver assembly 12 is transmitted from the throat 16 to the mouth 18 by means of a first sound passageway 20 of a circular or conical shape. The sound wave impinges on the tip surfaces 22 of a conical-shaped member 24 and is then reflected back down second annular sound passageways 26 of the member 24. The planar sound waves are expanded exponentially in the areas 26 as they approach the throat 30. The surfaces 32 reflect the sound waves forward and toward the mouth 34 and to the outside atmosphere 36.

It would therefore be desirable to provide an improved loudspeaker system for generating equivalent sound pressure levels of existing loudspeaker systems while occupying much less space and providing good thermal transfer to the surrounding ambient atmosphere. The dual diverging manifold loudspeaker system of the present invention represents an improvement over the existing prior art designs. The present loudspeaker system includes a generally cubically-shaped outer horn housing and an inner dome-like cap member for encapsulating therebetween a conventional compression driver assembly.

SUMMARY OF THE INVENTION

Accordingly, it is a general object of the present invention to provide an improved re-entrant type horn loudspeaker system which is well-suited for use in the emergency-warning loudspeaker industry, but yet overcomes all the disadvantages of the prior art loudspeaker designs.

It is an object of the present invention to provide a dual diverging manifold loudspeaker system which produces good thermal transfer to the turbulent air flow therearound and offers protection of the compression driver assembly from the outside environment.

It is another object of the present invention to provide a dual diverging manifold loudspeaker system which produces acoustic pressure levels at least equivalent to that of conventional horn loudspeakers while being smaller and more compact than those traditionally available.

It is still another object of the present invention to provide a dual diverging manifold loudspeaker system which affords excellent efficiency and frequency response but utilizes a conventional compression driver assembly that is commercially available.

In accordance with these aims and objectives, the present invention is concerned with the provision of a dual diverging manifold loudspeaker system which includes a generally cubically-shaped outer horn housing having a top wall, a pair of side walls, and a bottom wall and having an open mouth and a rear wall. A generally cylindrically-shaped cavity is formed of a wall member which is disposed within the housing. The cavity has front and back ends. The rear wall is formed integrally with the housing and is disposed to substantially close the back end of the cavity. The rear wall has a generally square shape and is formed with cut-out portions disposed in each of its four corners and a central aperture. A compression driver assembly is formed of a generally cylindrical configuration and has front and back ends. The compression driver assembly serves to convert electrical signals applied thereto into sound waves. The front end of the driver assembly has a port aligned with the central aperture of the rear wall for transmitting a planar sound wavefront thereto.

An inner dome-like cap member is disposed to cover the back end of the driver assembly and to close the front end of the cavity so as to encapsulate the driver assembly completely within the housing. A back plate member is secured adjacent to the rear wall of the housing. The back plate member includes a first diverter member for diverting the planar sound wavefront into two diverging sound wavefronts, a pair of second diverter members for splitting the two diverging sound wavefronts into four separate planar wavefronts, and a plurality of reflector members for deflecting forwardly the four separate planar wavefronts towards the open mouth of the housing. A manifold formed by the inner surfaces of the top wall, side walls, and bottom wall of the housing and the inner cap member is used to recombine the four separate planar wavefronts back into a single composite wavefront emanating from the open mouth of the housing.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is a diagrammatic view in longitudinal section of a prior art horn loudspeaker system of the double re-entrant type;

FIG. 2 is an exploded view of a dual diverging manifold loudspeaker system constructed in accordance with the principles of the present invention;

FIG. 3 is a perspective view of the outer horn housing of the loudspeaker system of FIG. 2;

DESCRIPTION OF THE PREFERRED EMBODIMENT

Figure 4:
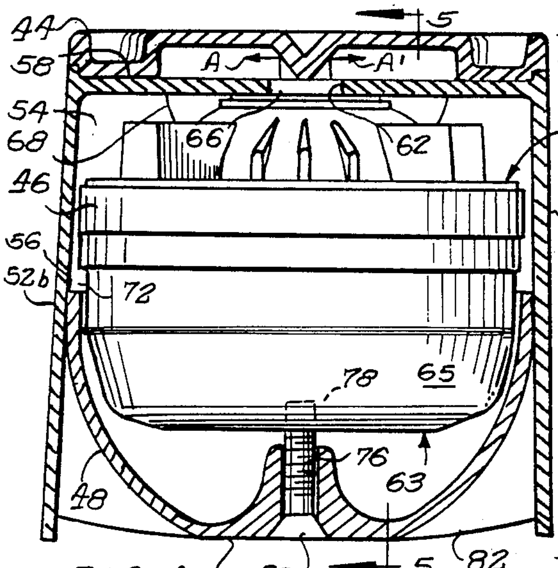
FIG. 4 is a cross-sectional view of the loudspeaker system in the assembled condition.

Referring now in detail to the various views of the drawings, and particularly to FIGS. 2–5, there is shown a dual diverging manifold loudspeaker system 40 of the present invention which includes a generally cubically-shaped outer horn housing 42, a co-mating back plate member 44, a conventional compression driver assembly 46, and an inner dome-like cap member 48. The back plate member 44 is secured adjacent to the back of the outer housing 42 by means of four screws 50 extending therethrough. The outer horn housing 42 is formed of a top wall **52*a*, a pair of sidewalls 52*b* and 52*c*, and a bottom wall 52*d* of substantially equal dimensions. A generally tubularly-shaped or cylindrically-shaped cavity 54 is formed within the outer horn housing 42 by a wall member 56. While the cross-sectional area of the cavity 54** is preferably circular in shape, it should be understood that the shape could also be made to be rectangular, square, oval and the like.

One end of the cavity 54 adjacent the rear end of the housing 42 is arranged with a rear wall 58 which is formed integrally with the housing so as to substantially close the back end of the cavity. The rear wall 58 is of a generally square shape and has a substantially triangularly-shaped cut-out portion 60 disposed in each of its four corners. The rear wall 58 includes a central aperture 62 which is aligned to receive sound pressures generated by a vibrating diaphragm (not shown) within the compression driver assembly 46. The rear wall 58 further includes a plurality of openings 64 which facilitate mounting of the driver assembly 46 and the back plate member 44, as will be explained hereinafter.

Within the cavity 54, there is disposed the conventional compression driver assembly 46 of a generally cylindrical shape. Unlike the existing prior art designs, the front end 61 of the driver assembly is positioned so as to face towards the back of the loudspeaker system. The driver assembly is utilized for providing conversion between electrical and mechanical stimuli. As can best be seen from FIGS. 4 and 5, the front end of the driver assembly 46 includes a port 66, which is in registration with the central aperture 62 in the rear wall 58, for delivering the sound pressures generated by the vibrating diaphragm. It will be noted that the back end 63 of the driver assembly is formed integrally with the curved metal magnetic cup assembly 65 which extends a predetermined distance in front of the cavity 54, as viewed from FIG. 4.

The front end 61 of the driver assembly also has a plurality of internally-threaded openings 68 which are aligned with the corresponding openings 64 in the rear wall 58. In order to fixedly secure the driver assembly 46 within the cavity 54, the four screws 50 are passed initially through aligned openings 70 formed in the back plate member 44 and the openings 64 in the rear wall 58. Then, the screws 50 are received within the respective internally-threaded openings 68 so as to mount the compression driver assembly 46. The drive assembly may be any one of the commercially available types, such as Sanming S-100, Atlas Sound SD-370, Federal Signal FS-100W, and their equivalents.

Figure 5:
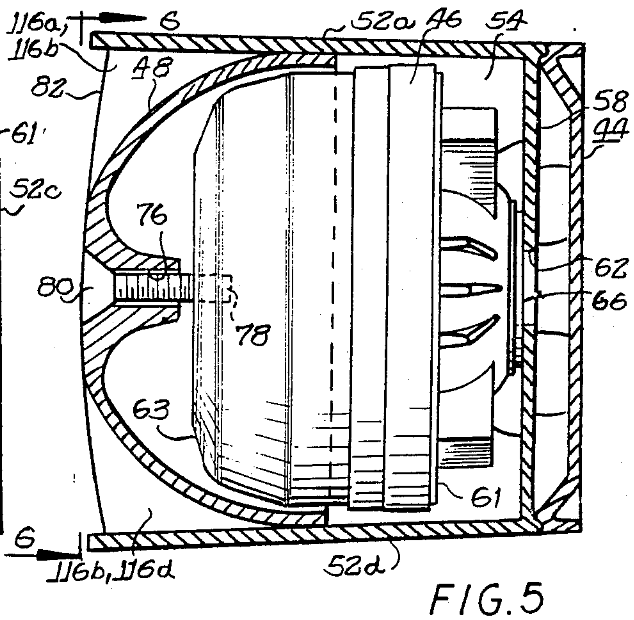
FIG. 5 is a cross-sectional view of the loudspeaker system, taken along the lines 5—5 of FIG. 4.
Figure 6:
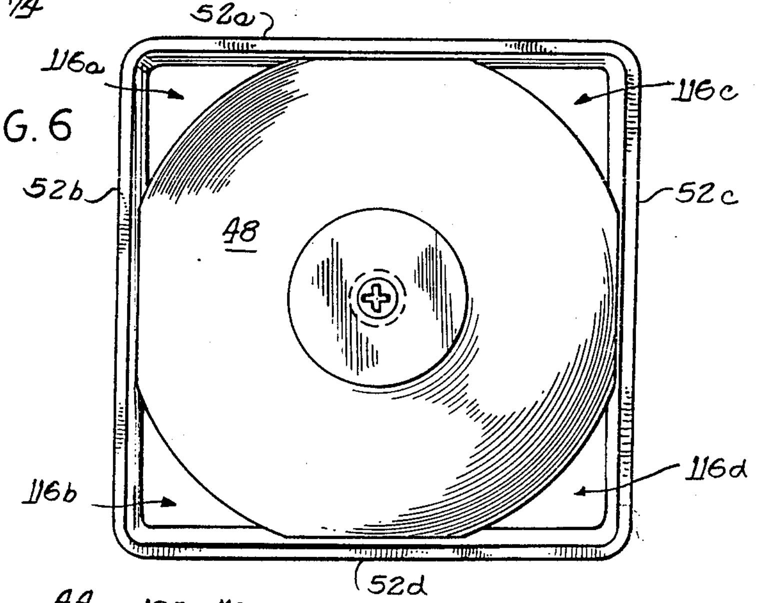
FIG. 6 is a front view of the loudspeaker system, taken along the lines 6—6 of FIG. 5.

As can be seen from FIGS. 4–6, the inner dome-like cap member 48 is utilized to cover the back end 63 of the driver assembly and to close the front end of the cavity 54 so as to protect the same from the elements of the outside environment. This provides a major advantage of reducing manufacturing costs without the use of an additional housing as well as time-consuming labor and assembly. Further, the present design also provides a pathway for heat to leave the driver assembly in the same direction as the acoustic waves are traveling. As a result, this allows other components and housings to be placed near the sides and the back of the instant loudspeaker system, which could not be done in existing designs due to temperature constraints. Moreover, since it is generally desired to locate emergency-warning loudspeakers so that they are exposed to the open ambient air for maximum sound output, this present design also permits the inner cap member to be exposed to the turbulent and thus well mixed, frontal air, thereby insuring proper thermal transfer from the compression driver assembly during operation.

The cap member 48 includes an annular surface 72 which fits in abutting relationship with the wall member 56, thereby completely encapsulating the driver assembly 46 within the horn housing 42. The top portion 74 of the cap member 48 includes an aperture 76 which is aligned with an internally-threaded recess 78 formed in the back end 63 of the driver assembly. A screw 80 is then passed through the aperture 76 and received in the internally-threaded recess 78 so as to fixedly secure the cap member 48 within the housing. The top portion 74 is substantially flush with a mouth 82 of the loudspeaker system.

Figure 7:
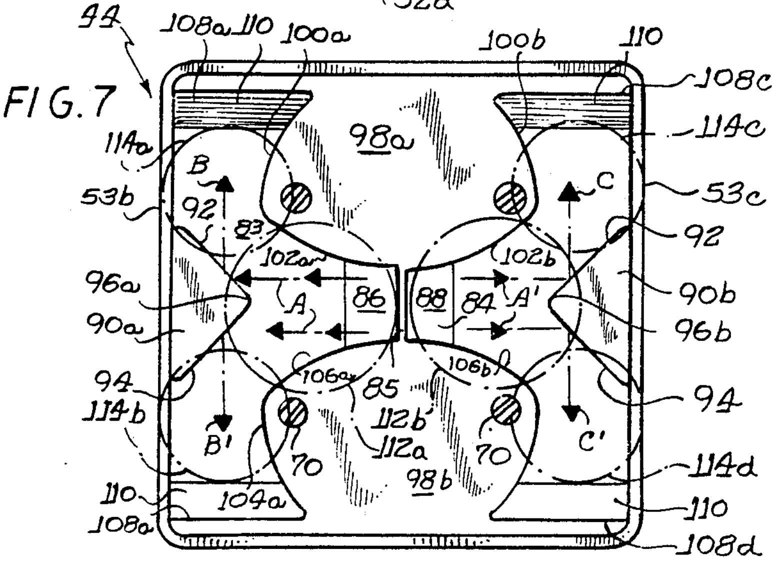
FIG. 7 is a front plan view of the back plate member of the loudspeaker system.

Referring now to FIG. 7, there is shown a front plan view of the back plate member 44. The back plate member is of a generally rectangular shape and includes an inner surface 83 having a V-shaped diverter member 84 formed in its central portion. The diverter member 84 is constructed by upwardly-directed surfaces 86 and 88 which are disposed approximately at a 45° angle to the inner surface 83. A tip portion 85 of the diverter member 84 is arranged so as to bisect the circular aperture 62 formed in the rear wall 58.

The back plate member 44 also includes a pair of V-shaped diverter members **90*a*, 90*b* formed in the intermediate area of the respective sidewalls 53*b* and 53*c*. Each of the diverter members 90*a*, 90*b* is constructed by inwardly-directed surfaces 92 and 94 which are disposed approximately at a 45° angle to the respective sidewalls. The diverter members 90*a*, 90*b* are made of raised triangular portions which are formed integrally with the inner surface 83. A tip surface 96*a* of the diverter member 90*a* is located to face the middle of the upwardly-directed surface 86. Similarly, the tip surface 96b of the diverter member 90b is located to face the middle of the upwardly-directed surface 88**.

The back plate member further includes a pair of raised apron-shaped portions 98a, 98b which are formed integrally with the inner surface 83. The apron-shaped portion 98a is defined by arcuate surfaces 100a, 100b, 102a and 102b. Similarly, the apron-shaped portion 98b is defined by arcuate surfaces 104a, 104b, 106a and 106b. Adjacent to each of the four corners of the back plate member 44, there is provided one of the plurality of reflector members 108a–108d. Each of the reflector members 108a–108d is formed of an inclined surface 110 which is disposed approximately at a 45° angle to the inner surface 83.

The path of the sound waves created by the driver assembly can be best explained and understood by reference to FIGS. 4–7. The single planar sound wavefront created and propelled rearwardly through the port 66 will be passed initially through the central aperture 62 in the rear wall 58 of the horn housing 42. As this occurs, the single wavefront is divided equally in opposite directions, as designated by arrows A, A′, by the upwardly-directed surfaces 86 and 88 of the diverter member 84 so as to form two diverging sound wavefronts (FIG. 4). The two diverging sound wavefronts then travel down respective circled horn section areas 112a, 112b where they are expanded exponentially. As can be seen from FIG. 7, the horn section area 112a is basically formed by the arcuate surfaces 102a and 106a. The horn section area 112b is basically formed by the arcuate surfaces 102b and 106b.

The diverging sound wavefront travelling in the direction of the arrows A is divided or split equally again in opposite directions, as designated by arrows B, B′, by the inwardly-directed surfaces 92, 94 of the diverter member 90a so as to form upward and downward diverging sound wavefronts. The upward and downward diverging sound wavefronts then travel through the respective circled horn section areas 114a, 114b, where they are further expanded exponentially. The horn section area 114a is defined essentially by the inner surface of the sidewall 53b and the arcuate surface 100a. The horn section area 114b is defined essentially by the inner surface of the sidewall 53b and the arcuate surface 104a.

Similarly, the diverging sound wavefronts travelling in the direction of the arrows A′ is divided or split equally again in opposite directions, as designated by arrows C, C′, by the inwardly-directed surfaces 92, 94 of the diverter member 90b so as to form upwardly and downwardly diverging sound wavefronts. The upward and downward sound wavefronts then travel through the respective circled horn section areas 114c, 114d where they are further expanded exponentially. The horn section area 114c is defined essentially by the inner surface of the sidewall 53c and the arcuate surface 100b. The horn section area 114d is defined essentially by the inner surface of the sidewall 53c and the arcuate surface 104b.

As a result, there are four separate sound wavefronts which are travelling in the direction of the arrows B, B′, C and C′ towards the respective four corners of the back plate member. These four separate wavefronts will be deflected forwardly by the inclined surfaces 110 of the reflector members 108a–108d toward the mouth 82 of the loudspeaker system. As this occurs, the four separate wavefronts will be finally sent forward through the four respective horn section areas 116a–116d where they are again expanded exponentially. These four horn section areas 116a–116d are essentially defined by the inner surfaces of the four walls 52a–52d of the horn housing and the inner cap member 48, which serves to create a manifold for recombining the four separate wavefronts back into one final composite wavefront emanating from the mouth 82 of the loudspeaker system (FIGS. 5 and 6).

The dual diverging manifold loudspeaker system of the present system has the following advantages over the prior art designs:

(a) it provides high sound pressures in excess of current industrial specifications which is achieved by utilizing a conventional compression driver assembly and a horn housing having an outer dimension smaller than a 5.25 inch cube;

(b) it offers unique positioning of the compression driver assembly within the horn housing so as to provide a path for good thermal transfer to the outside ambient atmosphere; and (c) it offers protection of the compression driver assembly from the outside environment due to encapsulation of the same within the horn housing.

From the foregoing detailed description, it can thus be seen that the present invention provides a dual diverging manifold loudspeaker system having a unique configuration which produces acoustical pressure levels at least equivalent to that of conventional loudspeakers. The loudspeaker system of the present invention includes a generally cubically-shaped outer horn housing and an inner dome-like cap member for encapsulating a conventional compression driver assembly therebetween.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. A dual diverging manifold loudspeaker system comprising:

a generally cubically-shaped outer horn housing being formed of a top wall, a pair of side walls, and a bottom wall, and having an open mouth and a rear wall;

a generally cylindrically-shaped cavity formed of a wall member disposed within said housing, said cavity having front and back ends;

said rear wall formed integrally with said housing and being disposed to substantially close the back end of said cavity, said rear wall having a generally square shape and being formed with cut-out portions disposed in each of its four corners and a central aperture;

a compression driver assembly being formed of a generally cylindrical configuration and having front and back ends, said compression driver assembly converting electrical signal applied thereto into sound waves, the front end of said driver assembly having a port aligned with the central aperture of said rear wall for transmitting a planar sound wavefront thereto;

an inner dome-like cap member being disposed to cover the back end of said driver assembly and to close the front end of said cavity so as to encapsulate said driver assembly completely within said housing;

a back plate member being secured adjacent to the rear wall of said housing;

said back plate member including first diverter means for diverting said planar sound wavefront into two diverging sound wavefronts, second diverter means for splitting said two diverging sound wavefronts into four separate planar wavefronts, and reflector means for deflecting forwardly said four separate planar wavefronts towards the open mouth of said housing; and manifold means formed by the inner surfaces of said top wall, side walls and bottom walls of said housing and said inner cap member for recombining four separate planar wavefronts back into a single composite waveform emanating from the open mouth of said housing.

2. A loudspeaker system as claimed in claim 1, wherein said first diverter means comprises a first V-shaped diverter member formed of a pair of upwardly-directed surfaces which are disposed approximately at a 45° angle to an inner surface of said back plate member.

3. A loudspeaker system as claimed in claim 2, wherein said second diverter means comprises a second V-shaped diverter member formed of a pair of inwardly-directed surfaces which are disposed approximately at a 45° angle to the inner surface of said back plate member, and a third V-shaped diverter member formed of a pair of inwardly-directed surfaces which are disposed approximately at a 45° angle to the inner surface of said back plate member.

4. A loudspeaker system as claimed in claim 3, wherein said reflector means comprises a plurality of reflector members disposed adjacent to each corner of said back plate member, said reflector members being disposed approximately at a 45° angle to the inner surface of said back plate member.

5. A loudspeaker system as claimed in claim 4, further comprising first horn section means disposed between said first diverter member and said second and third diverter members for exponentially expanding said two diverging sound wavefronts.

6. A loudspeaker system as claimed in claim 5, further comprising second horn section means disposed between said second and third diverter members and said plurality of reflector members for expanding exponentially said four separate sound wavefronts.

7. A loudspeaker system as claimed in claim 6, further comprising third horn section means disposed between said plurality of reflector members and said mouth of said housing for further expanding exponentially each of said four separate sound wavefronts.

8. A dual diverging manifold loudspeaker system comprising:

a generally cubically-shaped outer horn housing being formed of a top wall, a pair of side walls, and a bottom wall, and having an open mouth and a rear wall;

a generally cylindrically-shaped cavity formed of a wall member disposed within said housing, said cavity having front and back ends;

said rear wall formed integrally with said housing and being disposed to substantially close the back end of said cavity, said rear wall having a generally square shape and being formed with cut-out portions disposed in each of its four corners and a central aperture;

a compression driver assembly being formed of a generally cylindrical configuration and having front and back ends, said compression driver assembly converting electrical signal applied thereto into sound waves, the front end of said driver assembly having a port aligned with the central aperture of said rear wall for transmitting a planar sound wavefront thereto;

an inner dome-like cap member being disposed to cover the back end of said driver assembly and to close the front end of said cavity so as to encapsulate said driver assembly completely within said housing;

first diverter means for diverting said planar sound wavefront into two diverging sound wavefronts;

second diverter means for splitting said two diverging sound wavefronts into four separate planar wavefronts;

reflector means for deflecting forwardly said four separate planar wavefronts towards the open mouth of said housing; and manifold means formed by the inner surfaces of said top wall, side walls, and bottom wall of said housing and said inner cap member for recombining said four separate planar wavefronts into a single composite waveform emanating from the open mouth of said housing.

9. A loudspeaker system as claimed in claim 8, wherein said first diverter means comprises a first V-shaped diverter member formed of a pair of upwardly-directed surfaces which are aligned with the central aperture in said rear wall.

10. A loudspeaker system as claimed in claim 9, wherein said second diverter means comprises a second V-shaped diverter member formed of a pair of inwardly-directed surfaces which are disposed adjacent to one of the side walls of said housing, and a third V-shaped diverter member formed of a pair of inwardly-directed surfaces which are disposed adjacent to the other one of the side walls of said housing.

11. A loudspeaker system as claimed in claim 10, wherein said reflector means comprises a plurality of reflector members disposed adjacent to the cut-out portions disposed in each corner of said rear wall.

12. A loudspeaker system as claimed in claim 11, further comprising first horn section means disposed between said first diverter member and said second and third diverter members for exponentially expanding said two diverging sound wavefronts.

13. A loudspeaker system as claimed in claim 12, further comprising second horn section means disposed between said second and third diverter members and said plurality of reflector members for expanding exponentially said four separate sound wavefronts.

14. A loudspeaker system as claimed in claim 13, further comprising third horn section means disposed between said plurality of reflector members and said mouth of said housing for further expanding exponentially each of said four separate sound wavefronts.

15. A dual diverging manifold loudspeaker system comprising:

first diverter means for diverting a rearwardly-traveling planar sound wavefront into two diverging sound wavefronts;

second diverter means for splitting said two diverging sound wavefronts into four separate planar wavefronts;

reflector means for deflecting forwardly said four separate planar wavefronts toward an open mouth of said loudspeaker system; and manifold means for recombining said four separate planar wavefronts back into a single composite wavefront emanating from the open mouth ofsaid loudspeaker system.

16. A loudspeaker system as claimed in claim 15, wherein said first diverter means comprises a first V-shaped diverter member formed of a pair of upwardly-directed surfaces which are disposed approximately at a 45° angle to an inner surface of a back plate member.

17. A loudspeaker system as claimed in claim 16, wherein said second diverter means comprises a second V-shaped diverter member formed of a pair of inwardly-directed surfaces which are disposed approximately at a 45° angle to the inner surface of said back plate member, and a third V-shaped diverter member formed of a pair of inwardly-directed surfaces which are disposed approximately at a 45° angle to the inner surface of said back plate member.

18. A loudspeaker system as claimed in claim 17, wherein said reflector means comprises a plurality of reflector members disposed adjacent to each corner of said back plate member, said reflector members being disposed approximately at a 45° angle to the inner surface of said back plate member.

19. A loudspeaker system as claimed in claim 18, further comprising first horn section means disposed between said first diverter member and said second and third diverter members for exponentially expanding said two diverging sound wavefronts.

20. A loudspeaker system as claimed in claim 19, further comprising second horn section means disposed between said second and third diverter members and said plurality of reflector members for expanding exponentially said four separate sound wavefronts.

* * * * *